W. T. CARTER.
COASTER BRAKE.
APPLICATION FILED FEB. 5, 1912.

1,026,972.

Patented May 21, 1912.

WITNESSES
[signature]
Frank Wakefield

INVENTOR.
WALTER T. CARTER.
by [signature]
Attorney.

UNITED STATES PATENT OFFICE.

WALTER T. CARTER, OF LOS ANGELES, CALIFORNIA.

COASTER-BRAKE.

1,026,972.   Specification of Letters Patent.   Patented May 21, 1912.

Application filed February 5, 1912. Serial No. 675,664.

*To all whom it may concern:*

Be it known that I, WALTER T. CARTER, a citizen of the United States, residing at the city of Los Angeles, county of Los Angeles, and State of California, have invented new and useful Improvements in Coaster-Brakes, of which the following is a specification.

The object of my invention is to simplify the construction of coaster brakes for bicycles.

Figure 1:
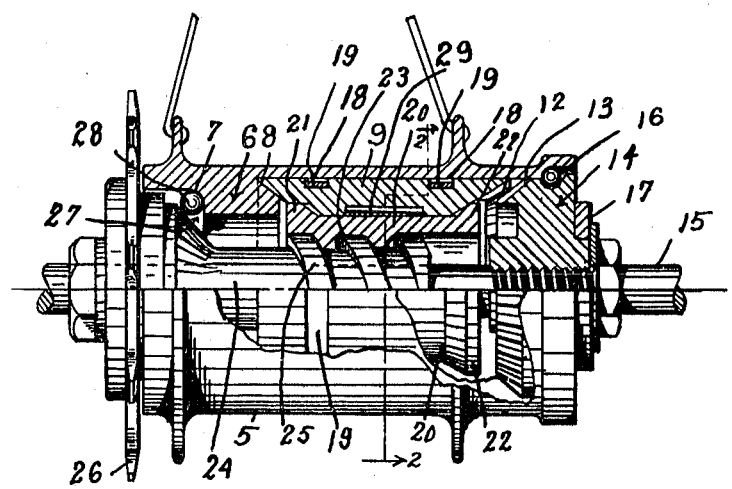
Figure 2:
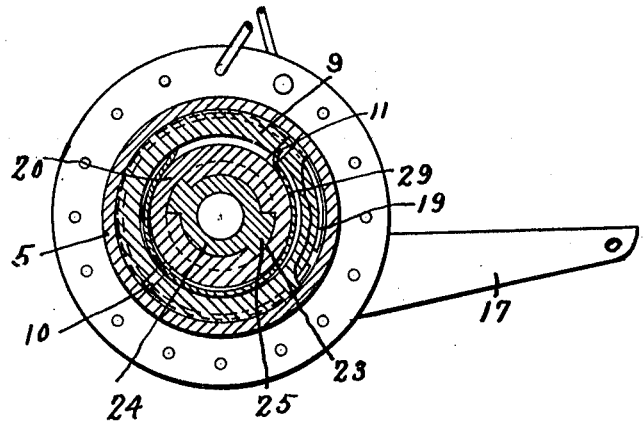

My construction is described herein and illustrated in the accompanying drawings forming a part hereof in which;

Figure 1 is a side elevation of the hub of a bicycle wheel equipped with my brake, some of the parts being partly in section. Fig. 2 is a cross section on the line 2—2 of Fig. 1.

In the drawings 5 is the outer shell of the hub of the driving wheel of a bicycle which is provided with an inwardly projecting annular flange 6 the outer portion 7 of which provides a portion of the ball race of the wheel. In the inner edge of the flange is a V-shaped groove which forms the inner edge 8 of the flange into a brake shoe expander. The outer edge of the annular brake shoe 9 is received in this groove and is expanded by the tapered expander into frictional engagement with the body of the hub. This brake shoe is formed in parts, preferably two, which are slightly separated at 10 and 11 when in their expanded position as shown in the drawings. At each end the brake shoe is internally beveled and the braking end is provided with teeth 12 which when the sleeve acts as a brake engage the bevel teeth 13 of the brake gear 14 which is screwed upon the axle 15 of the driving wheel. This gear is provided with a ball race 16 just outside the teeth 13. A brake lever 17 is mounted upon the shank of gear 14. The outer end of this lever when the brake is in use is secured to the frame of the machine. At each end of the brake shoe are external grooves 18 in which are mounted springs 19 which hold the parts of the shoe in spring tight engagement with the shoe operating spool 20.

The brake shoe is mounted on and has a slight longitudinal movement on spool 20 as hereafter explained. Spool 20 has inwardly tapered outwardly projecting flanges 21 and 22. Flange 22 may be called the driving flange and flange 21 the brake flange. Spool 20 has an interior double screw thread 23 for half its length. Mounted upon axle 15 is a sleeve 24 which has upon the inner end thereof a double screw thread 25 which screws into the spool. The outer end of sleeve 24 is enlarged and carries the sprocket wheel 26 upon which the driving chain (not shown) works. The enlarged end also forms a part of ball race 27 in which are carried balls 28. Between the spool and brake shoe is a friction spring 29 to prevent the too easy rotation of the brake shoe on the spool.

In the operation of my brake the same is placed upon a bicycle in the usual manner. When the operator desires to drive his machine he pedals forward which causes sleeve 24 to revolve in the direction which draws the brake shoe toward the sprocket wheel thereby expanding the shoe and locking it by frictional contact with and to the hub. If he desires to coast he stops pedaling. The momentum acquired causes the wheel to unscrew the brake shoe or cause it to travel away from the sprocket wheel thereby releasing it from its frictional engagement with the hub. If he desires to brake the wheel he back pedals which causes sleeve 24 to move spool 20 and the brake shoe away from the sprocket wheel until the teeth on the shoe engage the teeth on the brake gear 14. The spool moves a little farther and expands the brake shoe into frictional engagement with the hub and the movement of the wheel is retarded according to the force and amount of backpedaling employed. Whenever spool 20 is moved in either direction it moves the brake shoe a short distance before the flanges on the shoe expand the shoe. During this movement the springs on the outside of the shoe draw the parts of the shoe closer together.

Having described my invention what I claim is;

1. A coaster brake comprising a hub having an outer shell provided near one end with an inwardly projecting expanding flange; an annular expandible brake shoe having the ends tapered outwardly within the shell; an annular spool having expanding flanges at the ends thereof within the brake shoe, said spool being interiorly threaded; an axle; an annular spool operating screw mounted on the axle in threaded engagement with the spool; a sprocket wheel mounted on the outer end of said screw; a brake gear mounted on the axle within the hub at the end opposite the sprocket wheel; means for preventing the rotation of the brake shoe when it engages the brake gear and a brake lever secured upon said brake gear.

2. A coaster brake comprising a hub having brake shoe expanding means; an expandible brake shoe within said hub, means to move said shoe longitudinally and expand said shoe; and means to lock said brake shoe when the wheel is backpedaled.

In witness that I claim the foregoing I have hereunto subscribed my name this 23rd day of January, 1912.

WALTER T. CARTER.

Witnesses:
G. E. HARPHAM,
FRANK WATERFIELD.

---

Copies of this patent may be obtained for five cents each, by addressing the "Commissioner of Patents, Washington, D. C."